US012572750B2

(12) United States Patent
Muraoka et al.

(10) Patent No.: US 12,572,750 B2
(45) Date of Patent: Mar. 10, 2026

(54) LARGE LANGUAGE MODEL EVALUATION WITH ENHANCED INTERPRETABILITY BY K-NEAREST NEIGHBOR SEARCH

(71) Applicant: International Business Machines Corporation, Armonk, NY (US)

(72) Inventors: Masayasu Muraoka, Tokyo (JP); Yang Zhao, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 18/114,702

(22) Filed: Feb. 27, 2023

(65) Prior Publication Data

US 2024/0289558 A1     Aug. 29, 2024

(51) Int. Cl.
| | |
|---|---|
| *G06F 40/20* | (2020.01) |
| *G06F 16/334* | (2025.01) |
| *G06F 16/35* | (2025.01) |
| *G06F 40/284* | (2020.01) |
| *G06F 40/30* | (2020.01) |
| *G06F 40/40* | (2020.01) |
| *G06N 3/045* | (2023.01) |
| *G06N 3/08* | (2023.01) |

(Continued)

(52) U.S. Cl.
CPC ............. *G06F 40/40* (2020.01); *G06F 16/35* (2019.01); *G06F 40/20* (2020.01); *G06F 40/284* (2020.01); *G06F 40/30* (2020.01); *G06N 3/08* (2013.01); *G06N 3/09* (2023.01); *G06N 20/00* (2019.01); *G06F 16/3344* (2019.01); *G06N 3/045* (2023.01)

(58) Field of Classification Search
None
See application file for complete search history.

(56) References Cited

U.S. PATENT DOCUMENTS

| | | | | |
|---|---|---|---|---|
| 2016/0300154 A1* | 10/2016 | Bufe | ...................... | G06F 40/289 |
| 2020/0312301 A1* | 10/2020 | Polovets | .............. | G10L 15/065 |
| 2021/0374488 A1* | 12/2021 | Rajani | ...................... | G06N 3/08 |

(Continued)

OTHER PUBLICATIONS

Tony Z. Zhao, Eric Wallace, Shi Feng , Dan Klein, Sameer Singh; Calibrate Before Use: Improving Few-Shot Performance of Language Models; Dec. 5, 2022; URL: https://arxiv.org/pdf/2212. 02216 (Year: 2022).*

(Continued)

*Primary Examiner* — Richa Sonifrank
(74) *Attorney, Agent, or Firm* — Kristofer Haggerty

(57) ABSTRACT

Techniques for fine-tuning free evaluation of large language models with enhanced interpretability using a debiased output probability distribution of a large language model and a probability distribution of a k-Nearest Neighbor search result are provided. In one aspect, a method for performing a downstream task with a language model includes: constructing a datastore by applying the language model to a training set; applying the language model to a prompt-applied sentence from a testing set to obtain a language model feature vector; performing a k-Nearest Neighbor search of the datastore using the language model feature vector as a query vector; and interpolating a probability distribution of results from the k-Nearest Neighbor search and an output probability distribution of the language model to obtain a prediction for the downstream task.

24 Claims, 3 Drawing Sheets

(51) Int. Cl.
    G06N 3/09        (2023.01)
    G06N 20/00       (2019.01)

(56)                References Cited

U.S. PATENT DOCUMENTS

2024/0185518  A1*  6/2024  Kopp ........................ G06T 7/13
2024/0202458  A1*  6/2024  Zha ....................... G06F 40/279
2024/0289558  A1*  8/2024  Muraoka ................. G06F 40/30
2025/0168368  A1*  5/2025  Dupont .................. G06N 3/045

OTHER PUBLICATIONS

Feng Nie, Meixi Chen, Zhirui Zhang, Xu Cheng; Improving Few-Shot Performance of Language Models via Nearest Neighbor Calibration; Jun. 10, 2021; URL: https://arxiv.org/pdf/2102.09690 (Year: 2021).*
Nazneen Fatema Rajani, Ben Krause, Wengpeng Yin, Tong Niu, Richard Socher, Caiming Xiong; Explaining and Improving Model Behavior with k Nearest Neighbor Representations; Oct. 18, 2020; URL: https://arxiv.org/pdf/2010.09030 (Year: 2020).*
Frank F. Xu Uri Alon Graham Neubig; Why do Nearest Neighbor Language Models Work ?; Aug. 17, 2023; URL: https://arxiv.org/pdf/2301.02828 (Year: 2023).*
Weijia Shi, Julian Michael, Suchin Gururangan, Luke Zettlemoyer;kNN-Prompt: Nearest Neighbor Zero-Shot Inference; Nov. 1, 2022; URL: https://arxiv.org/pdf/2205.13792 (Year: 2022).*
Yue Xing, Qifan Song, Guang Cheng; Benefit of Interpolation in Nearest Neighbor Algorithms; Feb. 23, 2022; URL: https://arxiv.org/pdf/2202.11817 (Year: 2022).*
Hua et al., "Fine-tuning Pre-trained Language Models with Noise Stability Regularization," arXiv:2206.05658v1 (Jun. 2022) (15 pages).
Nazneen Fatema Rajani et al., "Explaining and Improving Model Behavior with k Nearest Neighbor Representations," arXiv:2010.09030v1 (Oct. 2020) (9 pages).
Izacard et al., "Atlas: Few-shot Learning with Retrieval Augmented Language Models," arXiv:2208.03299v3 (Nov. 2022) (33 pages).
Liu et al., "RoBERTa: A Robustly Optimized BERT Pretraining Approach," arXiv:1907.11692c1 (Jul. 2019) (13 pages).
Zhao et al., "Calibrate Before Use: Improving Few-Shot Performance of Language Models," Proceedings of the 38th International Conference on Machine Learning, PMLR 139, Jul. 2021 (10 pages).
Socher et al., "Recursive Deep Models for Semantic Compositionality Over a Sentiment Treebank," Proceedings of the 2013 Conference on Empirical Methods in Natural Language Processing, pp. 1631-1642 (Oct. 2013).
Khandelwal et al., "Nearest Neighbor Machine Translation," arXiv:2010.00710v2 (Jul. 2021) (14 pages).
Wolf et al., "Transformers: State-of-the-Art Natural Language Processing," Proceedings of the 2020 EMNLP (Systems Demonstrations), pp. 38-45 (Nov. 2020).
Devlin et al., "BERT: Pre-training of Deep Bidirectional Transformers for Language Understanding", Proceedings of NAACL-HLT 2019, pp. 4171-4186 (Jun. 2019).
Lample et al., "Cross-lingual Language Model Pretraining," arXic:1901.07291v1 (Jan. 2019) (10 pages).
Brian Lester, Blog, "Guiding Frozen Language Models with Learned Soft Prompts," Feb. 10, 2022 (5 pages).
Weyssow et al., "Recommending metamodel concepts during modeling activities with pre-trained language models," Software and Systems Modeling (Jun. 2022) (21 pages).
"Utilizing kNN Instances to Improve Accuracy and Interpretability in Zero/Few-shot Text Classification," Masayasu Muraoka and Yang Zhao, submitted to the 29th Annual Meeting of the Natural Language Processing Society (NLP2023) on Jan. 13, 2023 (6 pages)—Grace Period Disclosure.
"Utilizing kNN Instances to Improve Accuracy and Interpretability in Few-shot Text Classification Evaluation," Masayasu Muraoka, submitted to the 61st Annual Meeting of the Association for Computational Linguistics (ACL'23) on Jan. 21, 2023 (15 pages)—Grace Period Disclosure.

* cited by examiner

100

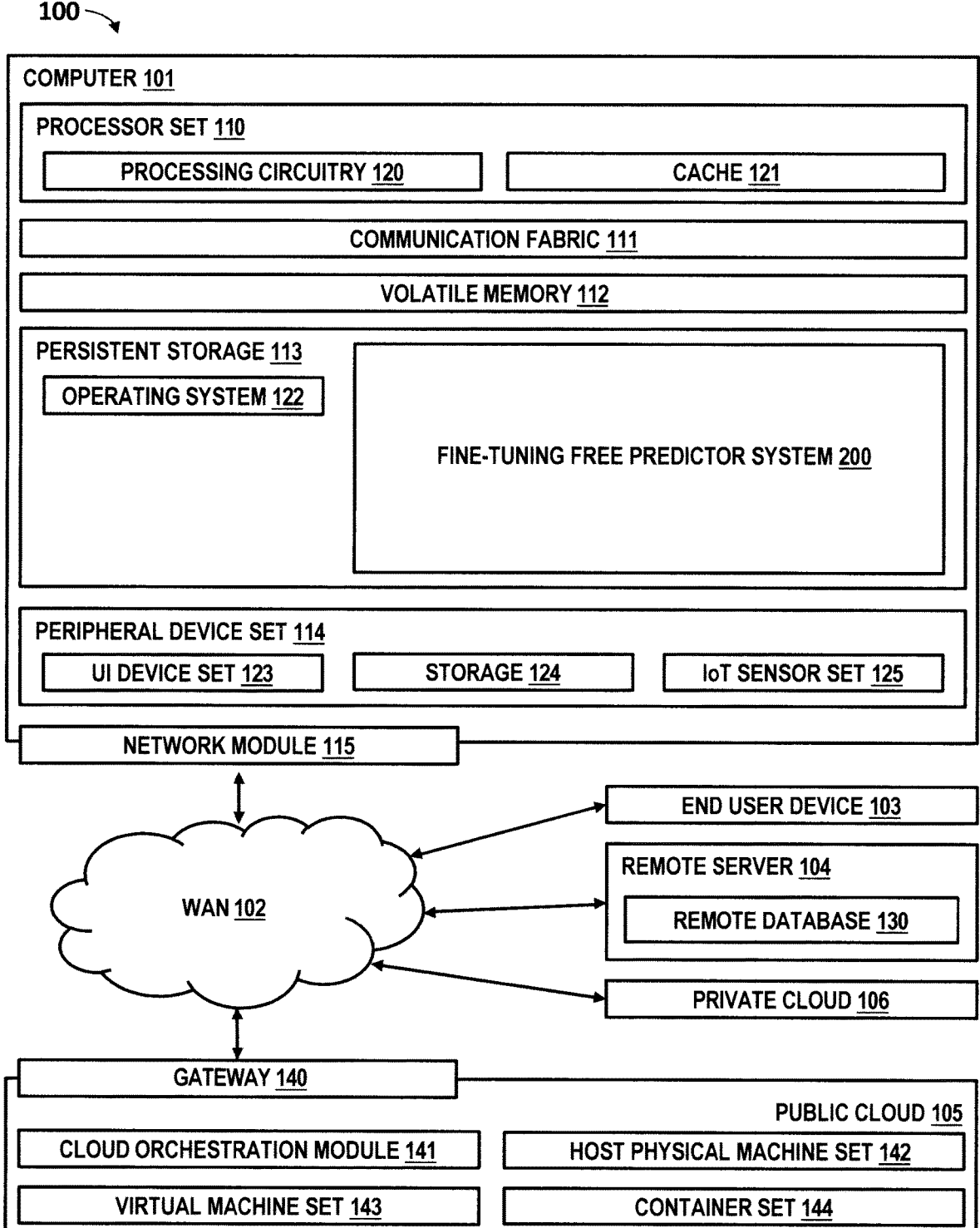

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

FINE-TUNING FREE PREDICTOR SYSTEM 200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

LARGE LANGUAGE MODEL EVALUATION WITH ENHANCED INTERPRETABILITY BY K-NEAREST NEIGHBOR SEARCH

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S)

"Utilizing kNN Instances to Improve Accuracy and Interpretability in Zero/Few-shot Text Classification," Masayasu Muraoka and Yang Zhao, submitted to the $29^{th}$ Annual Meeting of the Natural Language Processing Society (NLP2023) on Jan. 13, 2023 (6 pages).

"Utilizing kNN Instances to Improve Accuracy and Interpretability in Few-shot Text Classification Evaluation," Masayasu Muraoka, submitted to the $61^{st}$ Annual Meeting of the Association for Computational Linguistics (ACL'23) on Jan. 21, 2023 (15 pages).

FIELD OF THE INVENTION

The present invention relates to evaluating large language models without fine-tuning, and more particularly, to techniques for fine-tuning free evaluation of large language models with enhanced interpretability using a debiased output probability distribution of a large language model and a probability distribution of a k-Nearest Neighbor search result.

BACKGROUND OF THE INVENTION

Large language models have been proven capable for a variety of downstream tasks such as question answering, sentiment analysis and natural language inference. Evaluating the performance of large language models often includes fine-tuning the models on data in these downstream tasks. Fine-tuning however involves parameter updates, which means that the fine-tuned large language model is then adapted to a certain downstream task.

On the other hand, zero or few shot evaluation enables performance evaluation of a large language model without fine-tuning by reformulating a downstream task as a language modelling task using a prompt. Zero or few shot learning refers to the ability of a model to learn tasks with no or only limited training samples. Without fine-tuning, the model parameters do not need to be updated. Thus, zero or few shot evaluation advantageously provides a metric of the intrinsic performance of a large language model.

However, predictions made by large language models can be biased by the pre-training data or by the order of training instances given as a context in a few-shot evaluation. For example, large language models can show a prediction bias towards those answers that occur near the end of a prompt. Thus, merely changing the ordering of training instances in a prompt can have a profound effect on prediction accuracy.

A debiasing method has been recently proposed that suppresses large language model biasing behavior and improves performance in downstream tasks by fitting calibration parameters for the model that cause the prediction for a given input to be uniform across answers. However, this calibration approach leaves room for improvement, as its performance is far below that of fine-tuning evaluation.

Further, this method is less interpretable because it does not provide a reason for its prediction.

Therefore, techniques for fine-tuning free evaluation of large language models that improve the performance in downstream tasks over current methods, and which also increase the interpretability of the large language model predictions would be desirable.

SUMMARY OF THE INVENTION

The present invention provides techniques for fine-tuning free evaluation of large language models with enhanced interpretability using a debiased output probability distribution of a large language model and a probability distribution of a k-Nearest Neighbor search result. In one aspect of the invention, a method for performing a downstream task with a (frozen) language model is provided. The method includes: constructing a datastore by applying the language model to a training set; applying the language model to a prompt-applied sentence from a testing set to obtain a language model feature vector; performing a k-Nearest Neighbor search of the datastore using the language model feature vector as a query vector; and interpolating a probability distribution of results from the k-Nearest Neighbor search and an output probability distribution of the language model to obtain a prediction for the downstream task.

Advantageously, prior to interpolation, the output probability distribution of the language model can be processed (e.g., via vector scaling) to remove bias arising from the pre-training data or by the order of training instances given as a context in a few-shot evaluation. For instance, the output probability distribution of the language model can be debiased to obtain a debiased output probability distribution of the language model, after which the probability distribution of the results from the k-Nearest Neighbor search and debiased output probability distribution of the language model can be interpolated to obtain the prediction for the downstream task.

Further, the present techniques advantageously provide a mechanism to explain the prediction of the model, thereby enhancing interpretability of the prediction process. For instance, embodiments are contemplated herein where the results from the k-Nearest Neighbor search are also outputted to explain the prediction of the language model. Doing so explicitly shows which instance, i.e., sentences, from the datastore the language model considers to be close to the prompt-applied sentence.

In another aspect of the invention, another method for performing a downstream task with a language model is provided. The method includes: obtaining a dataset for the downstream task, the dataset having at least a training set and a testing set; constructing a datastore by applying the language model to the training set; applying the language model to a prompt-applied sentence from the testing set to obtain a language model feature vector; performing a k-Nearest Neighbor search of the datastore using the language model feature vector as a query vector; interpolating a probability distribution of results from the k-Nearest Neighbor search and a debiased output probability distribution of the language model to obtain a prediction for the downstream task; and outputting the results from the k-Nearest Neighbor search to explain the prediction of the language model.

In yet another aspect of the invention, yet another method for performing a downstream task with a language model is provided. The method includes: obtaining a dataset for the downstream task, the dataset having at least a training set and a testing set; constructing a datastore by applying the language model to the training set; applying the language model to a prompt-applied sentence prompt(x) from an instance x in the testing set to predict a label y and a large language model feature vector $h_{LLM}$(prompt(x)); computing an output probability distribution $P_{LM}$ of the language model; debiasing the output probability distribution $P_{LM}$ of the language model to obtain a debiased output probability distribution $\hat{p}_{debiasedLM}$; performing a k-Nearest Neighbor search of the datastore using the feature vector $h_{LLM}$(prompt (x)) as a query vector to find k-Nearest Neighbors $\mathcal{N}$; computing a probability distribution $\hat{p}_{kNN}$ of results from the k-Nearest Neighbor search; interpolating the debiased output probability distribution $\hat{p}_{debiasedLM}$ and the probability distribution $\hat{p}_{kNN}$ to obtain a final prediction $\hat{p}$(y|prompt(x)) for the downstream task; and outputting the results from the k-Nearest Neighbor search to explain the final prediction of the language model.

For instance, the output probability distribution $P_{LM}$ can be computed over a vocabulary V as $P_{LM}$(y∈V|prompt(x)). The final prediction $\hat{p}$(y|prompt(x)) can be computed as $\hat{p}$(y|prompt(x))=λ*$\hat{p}_{debiasedLM}$+(1−λ)*$\hat{p}_{kNN}$, with a coefficient λ∈[0,1].

A more complete understanding of the present invention, as well as further features and advantages of the present invention, will be obtained by reference to the following detailed description and drawings.

BRIEF DESCRIPTION OF THE DRAWINGS

FIG. 1 is a diagram illustrating an exemplary computing environment according to an embodiment of the present invention;

DETAILED DESCRIPTION OF PREFERRED EMBODIMENTS

Figure 2:
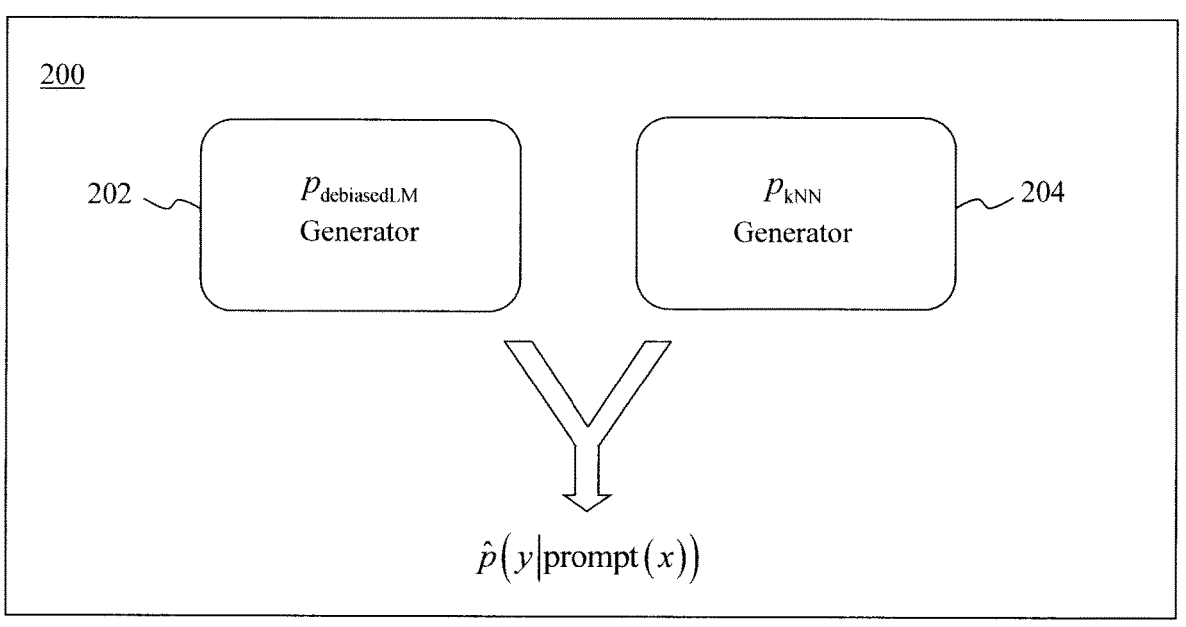
FIG. 2 is a diagram illustrating an exemplary debiased fine-tuning free predictor system according to an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as debiased fine-tuning free predictor system 200. In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in system 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As provided above, zero or few shot evaluation enables performance evaluation of a large language model without fine-tuning, i.e., fine-tuning free evaluation. Namely, the term 'fine-tuning free evaluation' as used herein is an evaluation that never updates the parameters (i.e., weights) in the large language model. According to an exemplary embodiment, the present techniques employ fine-tuning free evaluation. Thus, in that case, the corresponding large language model is frozen meaning that, following pre-training, the parameters (i.e., weights) in the large language model are never changed or updated, i.e., the model parameters are 'frozen.' A large language model predicts the most likely word/label y for the replacement of a [MASK] token given an input sentence x. To use a simple, illustrative example, an input sentence might be x="The cat is [MASK] some food." Mathematically, the large language model (LM) computes a probability distribution over a vocabulary V given the input sentence x, which is generally denoted as $P_{LM}(y \in V|x)$. For instance, $$P_{LM}(y = \text{eating} \mid x = \text{The cat is [MASK] some food.}) = 15\%,$$

$$P_{LM}(y = \text{walking} \mid x = \text{The cat is [MASK] some food.}) = 5\%.$$

With zero or few shot evaluation, a downstream task such as question answering, sentiment analysis, natural language inference, etc. is reformulated as a language modelling task using a prompt. Zero shot evaluation lets a large language model solve a task by giving only an instance in a test set. For instance, to use a sentiment analysis task as an example, given an input sentence such as "This is a funny film," a large language model fills in a [MASK] token in the following sentence:

Review: This is a funny film. Sentiment: [MASK] where the text in bold is a prompt appended to the sentence in order to perform zero-shot evaluation. The probabilities are then extracted that correspond to the output labels of the sentiment analysis task such as 'Positive' and 'Negative' to make a final prediction of the large language model. In-context few shot evaluation appends more than one instance from a training set in front of a test instance as a context and lets the large language model predict the [MASK] token.

However, these fine-tuning free evaluation approaches can have some notable drawbacks. For instance, an evaluation result can vary depending on the prompt used. Namely, it has been found that predictions made by large language models can be biased by the pre-training data and/or the order of training instances given as a context during in-context few shot evaluation.

Advantageously, provided herein are techniques that combine the debiased output probability distribution of a large language model with a probability distribution of a k-Nearest Neighbor search result to compute a final prediction that outperforms state-of-the-art approaches on downstream tasks. Further, the present techniques also contribute to improving the interpretability. Interpretability refers to whether the reason for a model making a particular prediction is apparent or not.

A k-Nearest Neighbor approach, where k is a number of instances, is a non-parametric, supervised learning classifier, which uses proximity to make classifications or predictions about the grouping of an individual data point. Notably, a k-Nearest Neighbor approach does not require any model updates while giving an interpretation to the predictions.

FIG. 2 is a diagram providing a general overview of debiased fine-tuning free predictor system 200 in accordance with the present techniques. As shown in FIG. 2, system 200 includes a generator 202 for generating a debiased output probability distribution from a large language model, i.e., $P_{debiasedLM}$, and a generator 204 for generating a probability distribution of a k-Nearest Neighbor search result, i.e., $p_{kNN}$. As will be described in detail below, $P_{debiasedLM}$ and $p_{kNN}$ are interpolated with a coefficient $\lambda \in [0,1]$ to obtain a final prediction $\hat{p}(y|prompt(x))$, where x is an input sentence in a dataset, and y is an output label. The prompt(•) function appends a text prompt to the input sentence x in order to perform zero or few shot (i.e., fine-tuning free) evaluation as described above.

According to an exemplary embodiment, the large language model is a transformer neural network. In machine learning and cognitive science, neural networks are a family of statistical learning models inspired by the biological neural networks of animals, and in particular the brain. Neural networks may be used to estimate or approximate systems and cognitive functions that depend on a large number of inputs and weights of the connections which are generally unknown. Neural networks are often embodied as so-called "neuromorphic" systems of interconnected processor elements which act as simulated "neurons" that exchange "messages" between each other in the form of electronic signals.

Figure 3:
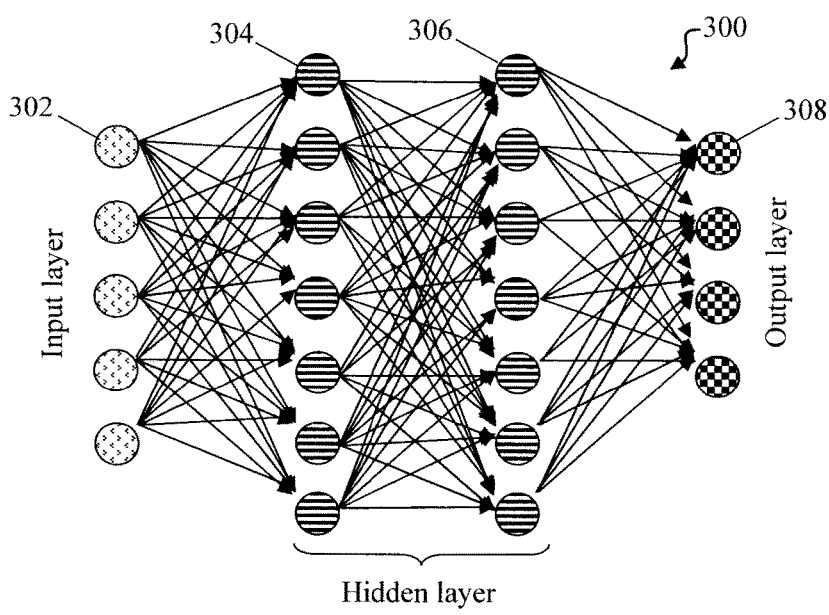
FIG. 3 is a diagram illustrating an exemplary neural network according to an embodiment of the present invention.

See, for example, exemplary neural network 300 shown in FIG. 3 that includes a plurality of interconnected processor elements 302, 304/306 and 308 that form an input layer, at least one hidden layer, and an output layer, respectively, of the neural network 300. The connections in neural networks that carry electronic messages between simulated neurons are provided with numeric weights (or simply 'weights') that correspond to the strength or weakness of a given connection. These weights can be adjusted and tuned based on experience, making neural networks adaptive to inputs and capable of learning. Typically, neural networks are trained on labeled sets of training data. Once trained, the neural network can be used for inference. Inference applies knowledge from a trained neural network model and uses it to infer a result. A fully connected layer (typically the last or last few layers in a neural network) is a layer where all of the inputs from one layer are connected to every activation unit of the next layer. The fully connected layer(s) compile the data extracted by previous layers of the neural network to form the final output.

Figure 4:
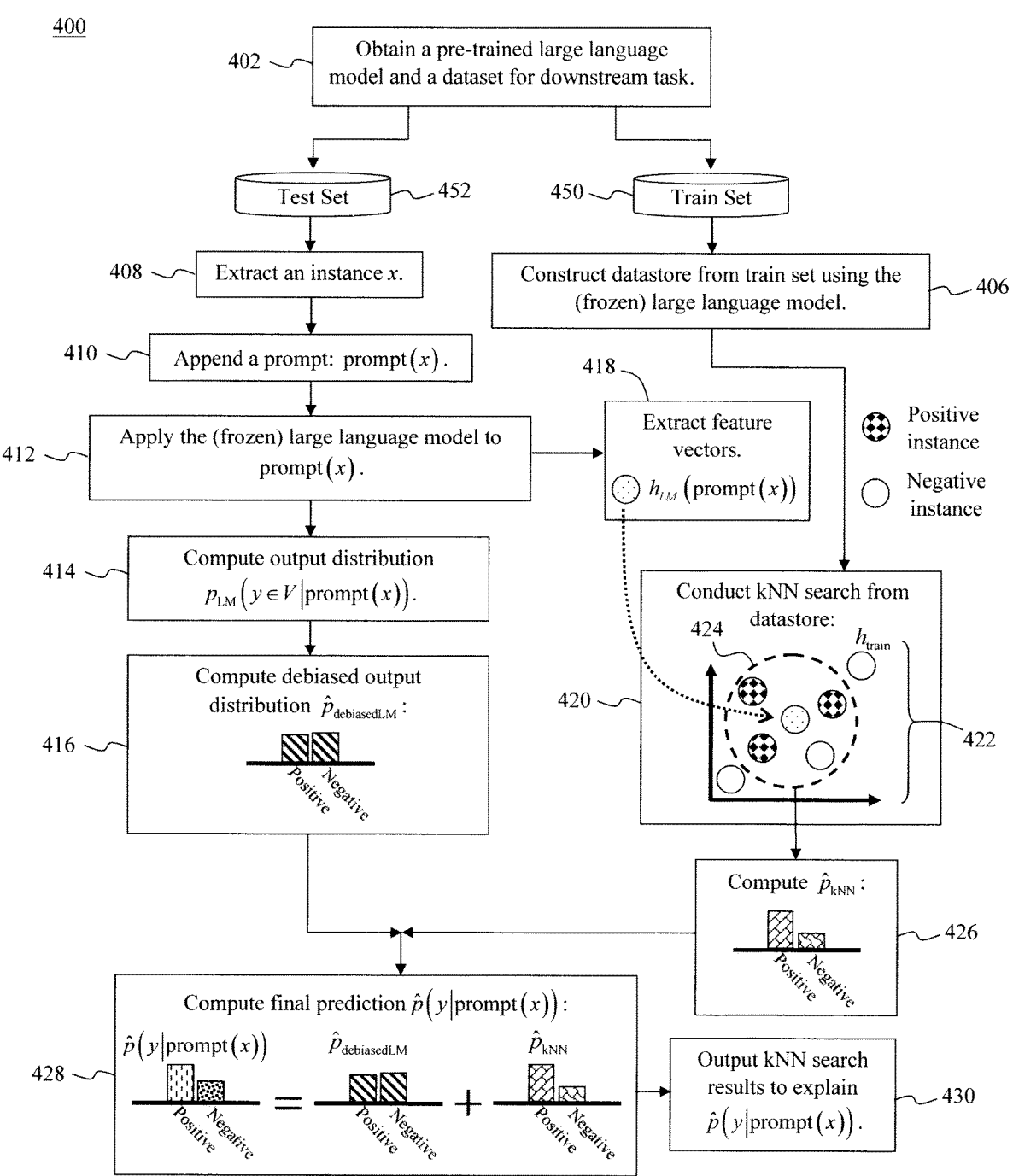
FIG. 4 is a diagram illustrating an exemplary methodology for performing downstream tasks with a large language model using the debiased fine-tuning free predictor system of FIG. 2 according to an embodiment of the present invention.

Given the above overview, FIG. 4 is a diagram illustrating an exemplary methodology 400 for performing downstream tasks with a large language model using, for example, debiased fine-tuning free predictor system 200. For instance, by way of example only, the generator 202 of system 200 can be employed for generating a debiased output probability distribution $p_{debiasedLM}$ using prompt-appended instances (i.e., sentences) prompt(x) from a testing subset of a dataset, and generator 204 can be employed for generating a probability distribution of a k-Nearest Neighbor search result $p_{kNN}$ using instances $x_{train}$ from a training subset of the dataset.

By way of example only, some downstream tasks can include, but are not limited to, question answering, sentiment analysis and/or natural language inference. Sentiment analysis, for example, can involve a text classification task where a determination is made as to whether a writing such as a written movie review is positive or negative. For instance, reviews such as "it is a funny film" or "it is not very interesting" are examples of written movie reviews for which a large language model may be tasked with predicting a sentiment label such as 'Positive' and 'Negative' respectively.

In step 402, a pre-trained large language model is obtained, as is a dataset for a downstream task performed using the large language model. According to an exemplary embodiment, the present techniques employ fine-tuning free evaluation which, as described above, is a process that never updates the parameters (i.e., weights) in the large language model. Thus, in that case, the corresponding large language model is frozen meaning that, following pre-training, the parameters (i.e., weights) in the large language model are never changed or updated. In other words, the large language model is a frozen model. As is generally known in the art, language modelling is used to determine the probability that a particular sequence of words forms a grammatically and semantically correct sentence. A large language model is a model that has a large number (e.g., more than 100 billion) of parameters and is trained on a large corpus of data. For instance, by way of example only, a pre-trained large language model such as Bidirectional Encoder Representations from Transformers (BERT) or its subsequent model Robustly optimized BERT approach (RoBERTa) may be employed in accordance with the present techniques.

According to an exemplary embodiment, the dataset fetched in step 402 includes sets of pairs, each pair having an input sentence x and a corresponding output label y. For instance, using the sentiment analysis example from above, an input sentence x/output label y pair in the dataset might be "it is a funny film"/'Positive.' Another input sentence x/output label y pair in the dataset might be "it is not very interesting"/'Negative,' and so on. As shown in FIG. 4, the dataset is split into a training (Train) set 450 and a testing (Test) set 452 (and a development (dev) set—though not shown). As will be described in detail below, the training set 450 will be leveraged to construct a datastore using the (frozen) large language model upon which a k-Nearest Neighbor search will be conducted. At the same time, the testing set 452 will be leveraged to compute a debiased output probability distribution of the (frozen) large language model. The debiased output probability distribution of the (frozen) large language model is then combined with a probability distribution of the k-Nearest Neighbor search result to make a final prediction for the downstream task.

Namely, in step 406, the datastore is created by applying the pre-trained (frozen) large language model to the training set 450 to obtain a multi-dimensional continuous large language model feature vector $h_{train}$ from each sentence $x_{train}$ in the training set 450. As will be described in detail below, a multi-dimensional continuous large language model feature vector $h_{LM}(prompt(x))$ will also be obtained by applying the large language model (LM) to each sentence extracted from the testing set 452 with an appended text prompt prompt(x). Since the designation $x_{train}$ refers to the sentences in the dataset that make up the training set 450 used to create the datastore, the datastore includes a set of triplets, where each triplet includes a sentence $x_{train}$ from the training set 450, its gold label y', and the large language model feature vector $h_{train}$ obtained by feeding the sentence $x_{train}$ to the large language model. In one exemplary, non-limiting embodiment, the large language model is pre-trained to predict words that can be filled in for masked tokens in an input sentence such as $x_{train}$. In that case, according to an exemplary embodiment, the large language model feature vector $h_{train}$ is a hidden vector of a second to last layer in the large language model and corresponds to a [MASK] token in the sentence $x_{train}$. As will be described in detail below, once the datastore is created, the results of a k-Nearest Neighbor search of the datastore will be combined with the debiased output of the large language model applied to the testing set 452 to compute a final prediction. It is notable that the steps of methodology 400 may be performed in any order including in an order different from that described herein. For instance, the training set 450-based datastore and the testing set 452 may be processed simultaneously to compute a probability distribution of the k-Nearest Neighbor search and a debiased probability distribution of the large language model (applied to the testing set 452) at the same time. Thus, even though some steps may be described before others, in practice any of these steps may be performed in parallel.

In step 408, an instance is extracted from the testing set 452. As provided above, according to an exemplary embodiment, the training set 450 and the testing set 452 (both which are subsets of the dataset) each includes sets of pairs, each pair having an input sentence x and a corresponding output label y. Thus, in step 408, a pair (i.e., an input sentence x and a corresponding output label y) can be extracted from the testing set 452.

As described above, the present techniques employ fine-tuning free evaluation (namely zero or few shot evaluation) whereby a prompt is used to reformulate a downstream task as a language modelling task. A language modelling task such as sentence classification is a multi-class classification task to predict an output label $y \in \mathcal{Y}$ given an input sentence x. $\mathcal{Y}$ is a pre-defined label set. For instance, this can be {Postive,Negative} in a sentiment analysis task towards movie reviews. To solve this task, a conditional probability distribution p(y|x) over labels from the large language model is computed. However, the large language model cannot directly compute it since the large language model is not fine-tuned on this task. Thus, this is why the task is reformulated as a masked language modelling task.

A large language model M is pre-trained to predict the most likely word/label y for a replacement of a [MASK] token given an input sentence x:

$$p(w_l \mid w_{\backslash l}; M), \tag{1}$$

where $w_{\backslash l}$ is a sentence in which an l-th word ($1 \leq l \leq L$) in an input sentence $x = w_1 w_2 \ldots w_L$ is replaced with the [MASK] token. Here, using a prompt, prompt(•), the large language model is told how to solve the task:

$$\text{prompt } (x) = \text{Review: } [x] \text{ Sentiment: [MASK].} \tag{2}$$

An arbitrary input sentence is inserted in [x]. A probability distribution p($w_L$|prompt(x);M) is obtained for words to be filled in with a mask token by feeding the input sentence with a prompt to the large language model. It is notable that this distribution is over all of the vocabulary V that the large language model can handle. A probability distribution over a label set Y can be obtained by extracting the probabilities that correspond to each label y in the label set Y and normalizing them to sum up to 1. Therefore, it should be met that $\mathcal{Y} \subset V$ If not, the label set $\mathcal{Y}$ has to be redefined to meet the condition. A final evaluation metric is obtained such as one comparing the accuracy of a predicted label $\hat{y} = \arg\max_{y \in} \mathcal{Y} p(y|x;M)$ with a gold label y* for all the instances in the testing set 452.

Thus, in step 410, a prompt is appended to the extracted instance. For instance, using a sentiment analysis task towards a movie review as an illustrative example, as described above the objective is to predict the sentiment label of a movie review given examples such as an Example 1: a funny film→Positive, and an Example 2: it is not very interesting→Negative. An instance extracted from the testing set 452 might be the sentence x: "it is quite a vision." In that case, the sentence x from the testing set 452 with appended prompt, i.e., prompt(x), can be Review: it is quite a vision. Sentiment: [MASK], where the prompt is shown in bold.

In step 412, the (frozen) large language model is applied to prompt(x) (i.e., the extracted instance, i.e., sentence, x from the testing set 452 with appended prompt). Similar to the datastore creation described above, applying the large language model to prompt(x) provides a set of triplets, where each triplet includes the prompt-appended sentence prompt(x), its predicted label y, and a large language model (LM) feature vector $h_{LM}$(prompt(x)). An output probability distribution over a label set Y for prompt(x) can then be obtained by extracting the probabilities that correspond to each label y in the label set Y and normalizing them to sum up to 1.

Namely, in step 414, an output distribution from the large language model $P_{LM}$ is computed over all of the vocabulary V that the large language model can handle as $P_{LM}$ (y∈V|prompt(•). As provided above, y is an output label predicted for a given input sentence x from a pre-defined label set $\mathcal{Y}$.

As highlighted above, predictions made by large language models can be biased by the pre-training data or by the order of training instances given as a context in a few-shot evaluation (e.g., large language models can show a prediction bias towards those answers that occur near the end of a prompt). Thus, according to an exemplary embodiment, the output distribution $P_{LM}$(y∈V|prompt(x)) is next debiased in step 416 to provide a debiased output probability distribution $\hat{P}_{debiasedLM}$, where:

$$\hat{P}_{debiasedLM} = W_{debias} P_{LM}(y \in V \mid \text{prompt } (x)).$$

As provided above, $P_{LM}$(y∈V|prompt(x)) is an output probability distribution of the large language model given a text prompt(x) from an instance x in the testing set 452. $W_{debias}$ corrects a biased output distribution of the large language model by vector scaling. As its name implies, vector scaling generally involves changing the length of a vector by a scaling factor. For instance, according to an exemplary embodiment, $W_{debias}$ is represented as a diagonal matrix, i.e., a matrix in which the entries outside of the main diagonal are all zero. More specifically, in one embodiment, $W_{debias} = diag(\hat{p}_{cf})^{-1}$ in which diag(v) is a function that returns a diagonal matrix of v, and a probability distribution $\hat{p}_{cf}$ (where cf stands for 'context free') is computed as:

$$\hat{p}_{cf} = \frac{1}{C}\sum_{c=1}^{C} P_{LM}(y \mid \text{prompt (context}_c)),$$

with a similar computation of $P_{LM}(y \in V|\text{prompt}(x))$ as above, giving different input texts prompt(context$_c$) to the large language model, where context$_c$ is context-free input. The difference in the computation is the input sentence (i.e., prompt(context$_c$) versus prompt (which alters the condition of the probability distribution. According to an exemplary embodiment, three different context-free inputs are used, namely {'N/A', ' ', '[MASK]'}.

In step 418, the large language model feature vector $h_{LM}(\text{prompt}(x))$ is extracted. As described in detail above, the feature vector $h_{LM}(\text{prompt}(x))$ is part of a triplet obtained by feeding prompt(x) to the large language model. According to an exemplary embodiment, this feature vector is a hidden state in the final layer of the large language model. The designation prompt(x) is used to indicate the prompt-applied sentence instead of a raw sentence x in the testing set 452. By contrast, the designation $h_{train}$ is used to denote the feature vector obtained from sentence $x_{train}$ in the training set 450 using the large language model.

In step 420, a search of the datastore to find the k-Nearest Neighbors N is conducted using the feature vector $h_{LM}$ (prompt(x)) of prompt(x) (extracted in step 418 above) as a query vector. As described above, a k-Nearest Neighbor (kNN) approach (where k is a number of instances) is a non-parametric, supervised learning classifier, which uses proximity to make classifications or predictions about the grouping of an individual data point. According to an exemplary embodiment, k∈{0,1,4,8}. For instance, the example depicted in step 420 of FIG. 4 is provided to illustrate how a k-Nearest Neighbor search is employed in accordance with the present techniques to determine how many instances in the datastore (e.g., Positive and Negative instances in the datastore for sentiment analysis in movie reviews) are close to the query vector $h_{LM}(\text{prompt}(x))$. For clarity, the query vector $h_{LM}(\text{prompt}(x))$ and the Positive and Negative instances in the datastore are depicted using circles having unique patterns or lack of pattern. Namely, a circle with a dotted pattern is used to represent the query vector $h_{LM}(\text{prompt}(x))$ of prompt(x), which serves as a testing instance in the present example. Circles with a diamond-shaped pattern are used to represent Positive training instances of the feature vectors h in the datastore corresponding to sentences $x_{train}$ and labels y' like '(you have to see it, Positive).' Un-patterned circles are used to represent Negative training instances of the feature vectors $h_{train}$ in the datastore corresponding to sentences $x_{train}$ and labels y' like '(wait to see it, Negative).' As will be described in detail below, a probability distribution of the k-Nearest Neighbor search result will be defined over the label set that has these two labels, Positive and Negative.

Specifically, a feature space 422 (i.e., the datastore) is shown which is built on the feature vectors $h_{train}$ obtained from the large language model and the Positive and Negative training instances (i.e., circles with a diamond-shaped pattern and un-patterned circles, respectively) closest to the testing instance $h_{LM}(\text{prompt}(x))$ aka the query vector (shown as the circle with a dotted pattern). The distance between the circles illustrates the similarity between the instances, regardless of which set, training or testing set, an instance originates from. According to the present techniques, the k-Nearest Neighbor (kNN) search result, i.e., the k closest instances to the query vector $h_{LM}(\text{prompt}(x))$, will be used to compute a probability distribution $\hat{p}_{kNN}$. See Equation 3, below. For example, when k=4, the four closest instances to the query vector $h_{LM}(\text{prompt}(x))$ are used as shown in FIG. 4, which are inside the dashed circle 424. In the present example, there are three positive instances and one negative instance as the k-Nearest Neighbor instances (k=4). Thus, the positive probability is almost three times higher than the negative probability in the resultant probability distribution $\hat{p}_{kNN}$, see below.

Namely, in step 426, the probability distribution $\hat{p}_{kNN}$ is computed of the k-Nearest Neighbor search results from step 420. According to an exemplary embodiment, $$\hat{p}_{kNN} = \frac{1}{|N|}\sum_{(\_,y',h_{train})\in N} \mathbb{1}_{y=y'}\left(\frac{-\|h_{train} - h_{LM}(\text{prompt }(x))\|}{T}\right), \quad (3)$$

where the number of instances k E {0,1,4,8}, and where T or temperature is a hyperparameter used for scaling to control a randomness of the predictions. In one exemplary embodiment, T=1000: temperature, $\mathbb{1}_{y=y'}$: one-hot vector, in which only the dimension corresponding to y' has a value of 1 and 0 otherwise. The designation $(\_,y',h_{train})$ represents an above-described triplet in the datastore that includes a given instance_ (i.e., sentence, but not used in the computation in Equation 3) from the training set 450, the predicted label y', and feature vector $h_{train}$, respectively.

In step 428, a final prediction $\hat{p}(y|\text{prompt}(x))$ of the large language model is computed by combining the output probability distribution from the large language model and the probability distribution $\hat{p}_{kNN}$ computed of the k-Nearest Neighbor search results. According to an exemplary embodiment, the debiased output probability distribution $\hat{p}_{debiasedLM}$ (from step 416) is used in the computation, and $\hat{p}_{debiasedLM}$ and $\hat{p}_{kNN}$ are interpolated with a coefficient 1. Interpolation is a technique used to find new data points based on the range of a discrete set of known data points. For example, in one embodiment, $$\hat{p}(y \mid \text{prompt }(x)) = \lambda * \hat{p}_{debiasedLM} + (1-\lambda) * \hat{p}_{kNN},$$

where $\lambda \in [0,1]$.

This interpolation process is illustrated using a schematic diagram in FIG. 4. Namely, referring to the depiction of step 428 in FIG. 4, it can be seen that the prediction $\hat{p}(y|\text{prompt}(x))$ is the result of combing the $\hat{p}_{debiasedLM}$ from step 416 displaying the (debiased) large language model output probability distribution of Positive and Negative label y predictions for sentiment analysis from prompt(x), and the $\hat{p}_{kNN}$ from step 426 displaying the probability distribution of Positive and Negative label y' predictions for sentiment analysis from the k-Nearest Neighbor search results.

It is notable however, that the present techniques are more generally applicable to the combination of any output probability distribution from the large language model with the probability distribution $\hat{p}_{kNN}$, including the (pre-debiased) output distribution $P_{LM}(y \in V|\text{prompt}(x))$ (from step 414). As such, embodiments are also contemplated herein where the final prediction $\hat{p}(y|\text{prompt}(x))$ of the large language model is alternatively computed as:

$$\hat{p}(y \mid \text{prompt}(x)) = \lambda * P_{LM} + (1-\lambda) * \hat{p}_{kNN},$$

where $\lambda \in [0,1]$.

Further, as provided above, the present techniques advantageously also provide a means for boosting the interpretability of the large language model predictions using the k-Nearest Neighbor search results. Interpretability refers to how apparent a model prediction is. A model that provides an output label with little to no insight into how the prediction is made has low interpretability. On the other hand, interpretability is enhanced when the reasoning behind a particular prediction is provided to the user. Conventional approaches to fine-tuning free evaluation largely have low interpretability as they have no mechanism to explain the prediction of the model. By comparison, the present techniques advantageously fall into the latter category thanks to the insight provided by the k-Nearest Neighbor search results. Namely, the k-Nearest Neighbor search results explicitly show which instance, i.e., sentences, from the datastore the large language model considers to be close to the input sentence prompt(x). To do so, in addition to outputting the final prediction $\hat{p}(y \mid \text{prompt}(x))$ to a user, in step 430 the results from the k-Nearest Neighbor search of the datastore (see step 420, described above) also output to the user by system 200 as a way to explain the prediction of the large language model.

For instance, consider a scenario where the present techniques as well as the conventional zero/few-shot approaches all fail to predict the gold label y, which in this example should be 'Negative,' given an input sentence "is it a comedy?". As provided above, the conventional approaches do not generate any reason to explain why they predicted a wrong label. On the other hand, the present techniques advantageously provide an explanation in the form of the k-Nearest Neighbor search results. For example, when the k-Nearest Neighbor results consist of 'Positive' instances such as "it is funny," "a funny film," "a surprisingly funny movie," and "the film grows on you," in which the feature vector $h_{train}$ and label y in a triplet that form an element of the datastore are omitted for brevity, it is explained that the present language model considers the input sentence "is it a comedy?" as a Positive instance. Thus, the present techniques have a higher interpretability.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for performing a downstream task with a language model, the method comprising:
  obtaining a dataset for the downstream task, the dataset comprising at least a training set and a testing set;
  constructing a datastore by applying the language model to the training set, the datastore comprising a set of triplets with each triplet including an instance $x_{train}$ from the training set, a label y', and a feature vector $h_{train}$, and wherein the feature vector $h_{train}$ corresponds to a masked token in the sentence $x_{train}$;
  applying the language model to a prompt-applied sentence prompt(x) from an instance x in the testing set to predict a label y and a large language model feature vector $h_{LLM}(\text{prompt}(x))$;

computing an output probability distribution $P_{LM}$ of the language model;
  debiasing the output probability distribution $P_{LM}$ of the language model to obtain a debiased output probability distribution $\hat{p}_{debiasedLM}$;
  performing a k-Nearest Neighbor search of the datastore using the feature vector $h_{LLM}$ prompt(x)) as a query vector to find k-Nearest Neighbors N;
  computing a probability distribution $\hat{p}_{kNN}$ of results from the k-Nearest Neighbor search, wherein $\hat{p}_{kNN}$ is computed as:

$$\hat{p}_{kNN} = \frac{1}{|\mathcal{N}|} \sum_{(\_,y',h_{train}) \in \mathcal{N}} \mathbb{1}_{y=y'} \exp\left(\frac{-\|h_{train} - h_{LM}(\text{prompt }(x))\|}{T}\right) \text{ using } T$$

as a scaling hyperparameter;
  interpolating the debiased output probability distribution $\hat{p}_{debiasedLM}$ and the probability distribution $\hat{p}_{kNN}$ to obtain a final prediction $\hat{p}(y \mid \text{prompt}(x))$ for the downstream task; and
  outputting the results from the k-Nearest Neighbor search to explain the final prediction of the language model.

2. The method of claim 1, wherein parameters of the language model are frozen.

3. The method of claim 1, further comprising:
  extracting an instance x from the testing set; and
  applying a prompt to the instance x to obtain the prompt-applied sentence prompt(x).

4. The method of claim 1, wherein the label y is predicted from a pre-defined label set Y.

5. The method of claim 4, wherein the output probability distribution $P_{LM}$ is computed over a vocabulary V as $P_{LM}$ (y∈ V|prompt(x)).

6. The method of claim 1, wherein $\hat{p}_{debiasedLM}=W_{debias}P_{LM}(y \in V|\text{prompt}(x))$, wherein $W_{debias}=\text{diag}(\hat{p}_{cf})^{-1}$ in which diag(v) is a function that returns a diagonal matrix of v, and wherein $\hat{p}_{cf}$ is computed from $\hat{p}_{cf}=1/C \sum_{c=1}^{C} P_{LM}(y|\text{prompt}(\text{context}_c))$ by giving different input texts prompt(context$_c$)) to the language model where context$_c$ is context-free input.

7. The method of claim 1, wherein k is a number of instances, and wherein k∈ {0,1,4,8}.

8. The method of claim 1, wherein $\hat{p}(y|\text{prompt}(x))=\lambda * \hat{p}_{debiasedLM} + (1-\lambda) * \hat{p}_{kNN}$, and wherein $\lambda \in [0,1]$.

9. A computer program product for performing a downstream task with a language model, the computer program product comprising a computer readable storage medium having program instructions embodied therewith, the program instructions executable by a computer to cause the computer to perform:
  obtaining a dataset for the downstream task, the dataset comprising at least a training set and a testing set;
  constructing a datastore by applying the language model to the training set, the datastore comprising a set of triplets with each triplet including an instance $x_{train}$ from the training set, a label y', and a feature vector $h_{train}$, and wherein the feature vector $h_{train}$ corresponds to a masked token in the sentence $x_{train}$;
  applying the language model to a prompt-applied sentence prompt(x) from an instance x in the testing set to predict a label y and a large language model feature vector $h_{LLM}(\text{prompt}(x))$;
  computing an output probability distribution $P_{LM}$ of the language model;

debiasing the output probability distribution $P_{LM}$ of the language model to obtain a debiased output probability distribution $\hat{p}_{debiasedLM}$;

performing a k-Nearest Neighbor search of the datastore using the feature vector $h_{LLM}(\text{prompt}(x))$ as a query vector to find k-Nearest Neighbors N;

computing a probability distribution $\hat{p}_{kNN}$ of results from the k-Nearest Neighbor search, wherein $\hat{p}_{kNN}$ is computed as:

$$\hat{p}_{kNN} = \frac{1}{|N|} \sum_{(\_,y',h_{train})\in N} \mathbb{1}_{y=y'} \exp\left(\frac{-\|h_{train} - h_{LM}(\text{prompt}(x))\|}{T}\right)$$

using T as a scaling hyperparameter;

interpolating the debiased output probability distribution $\hat{p}_{debiasedLM}$ and the probability distribution $\hat{p}_{kNN}$ to obtain a final prediction $\hat{p}(y|\text{prompt}(x))$ for the downstream task; and outputting the results from the k-Nearest Neighbor search to explain the final prediction of the language model.

10. The computer program product of claim 9, wherein parameters of the language model are frozen.

11. A system for performing a downstream task with a language model comprising a processor, connected to a memory, operable to perform:

obtaining a dataset for the downstream task, the dataset comprising at least a training set and a testing set;

constructing a datastore by applying the language model to the training set, the datastore comprising a set of triplets with each triplet including an instance $x_{train}$ from the training set, a label y', and a feature vector $h_{train}$, and wherein the feature vector $h_{train}$ corresponds to a masked token in the sentence $x_{train}$;

applying the language model to a prompt-applied sentence prompt(x) from an instance x in the testing set to predict a label y and a large language model feature vector $h_{LLM}(\text{prompt}(x))$;

computing an output probability distribution $P_{LM}$ of the language model;

debiasing the output probability distribution $P_{LM}$ of the language model to obtain a debiased output probability distribution $\hat{p}_{debiasedLM}$;

performing a k-Nearest Neighbor search of the datastore using the feature vector $h_{LLM}(\text{prompt}(x))$ as a query vector to find k-Nearest Neighbors N;

computing a probability distribution $\hat{p}_{kNN}$ of results from the k-Nearest Neighbor search, wherein $\hat{p}_{kNN}$ is computed as:

$$\hat{p}_{kNN} = \frac{1}{|N|} \sum_{(\_,y',h_{train})\in N} \mathbb{1}_{y=y'} \exp\left(\frac{-\|h_{train} - h_{LM}(\text{prompt}(x))\|}{T}\right)$$

using T as a scaling hyperparameter;

interpolating the debiased output probability distribution $\hat{p}_{debiasedLM}$ and the probability distribution $\hat{p}_{kNN}$ to obtain a final prediction $\hat{p}(y|\text{prompt}(x))$ for the downstream task; and outputting the results from the k-Nearest Neighbor search to explain the final prediction of the language model.

12. The computer program product of claim 9, further comprising:

extracting an instance x from the testing set; and applying a prompt to the instance x to obtain the prompt-applied sentence prompt(x).

13. The computer program product of claim 9, wherein the label y is predicted from a pre-defined label set Y.

14. The computer program product of claim 13, wherein the output probability distribution $P_{LM}$ is computed over a vocabulary V as $P_{LM}(y=V \text{ prompt}(x))$.

15. The computer program product of claim 9, wherein $\hat{p}_{debiasedLM}=W_{debias}P_{LM}(y\in V|\text{prompt}(x))$, wherein $W_{debias}=\text{diag}(\hat{p}_{cf})^{-1}$ in which diag(v) is a function that returns a diagonal matrix of v, and wherein $\hat{p}_{cf}$ is computed from $\hat{p}_{cf}=1/C_{\Sigma c=1}{}^{C}P_{LM}(y|\text{prompt}(\text{context}_c))$ by giving different input texts prompt($\text{context}_c$)) to the language model where $\text{context}_c$ is context-free input.

16. The computer program product of claim 9, wherein k is a number of instances, and wherein $k\in\{0, 1, 4, 8\}$.

17. The computer program product of claim 9, wherein $\hat{p}(y|\text{prompt}(x))=\lambda*\hat{p}_{debiasedLM}+(1-\lambda)*\hat{p}_{kNN}$, and wherein $\lambda\in[0,1]$.

18. The system of claim 11, wherein parameters of the language model are frozen.

19. The system of claim 11, further comprising:

extracting an instance x from the testing set; and applying a prompt to the instance x to obtain the prompt-applied sentence prompt(x).

20. The system of claim 11, wherein the label y is predicted from a pre-defined label set Y.

21. The system of claim 20, wherein the output probability distribution $P_{LM}$ is computed over a vocabulary V as $P_{LM}(y\in V|\text{prompt}(x))$.

22. The system of claim 11, wherein $\hat{p}_{debiasedLM}=W_{debias} P_{LM}(y\in V|\text{prompt}(x))$, wherein $W_{debias}=\text{diag}(\hat{p}_{cf})^{-1}$ in which diag(v) is a function that returns a diagonal matrix of v, and wherein $\hat{p}_{cf}$ is computed from $\hat{p}_{cf}=1/C_{\Sigma c=1}{}^{C}P_{LM}(y|\text{prompt}(\text{context}_c))$ by giving different input texts prompt($\text{context}_c$) to the language model where $\text{context}_c$ is context-free input.

23. The system of claim 11, wherein k is a number of instances, and wherein $k\in\{0,1,4,8\}$.

24. The system of claim 11, wherein $\hat{p}(y|\text{prompt}(x))=\lambda*\hat{p}_{debiasedLM}+(1-\lambda)*\hat{p}_{kNN}$, and wherein $\lambda\in[0,1]$.

\* \* \* \* \*